United States Patent
Cheung et al.

(10) Patent No.: US 10,809,764 B2
(45) Date of Patent: Oct. 20, 2020

(54) TABLET COMPUTER SURFACE MOUNT

(71) Applicants: Steven Wai-Tong Cheung, Plainview, NY (US); Sergio Portella Dealbuquerque, Plainview, NY (US)

(72) Inventors: Steven Wai-Tong Cheung, Plainview, NY (US); Sergio Portella Dealbuquerque, Plainview, NY (US)

(*) Notice: Subject to any disclaimer, the term of this patent is extended or adjusted under 35 U.S.C. 154(b) by 11 days.

(21) Appl. No.: 16/116,860

(22) Filed: Aug. 29, 2018

(65) Prior Publication Data

US 2020/0073437 A1  Mar. 5, 2020

(51) Int. Cl.
  *G06F 1/16* (2006.01)
  *H05K 5/00* (2006.01)
  *H05K 7/00* (2006.01)
  *H02G 3/14* (2006.01)
  *F16M 13/02* (2006.01)

(52) U.S. Cl.
  CPC ............. *G06F 1/1632* (2013.01); *H02G 3/14* (2013.01); *F16M 13/02* (2013.01)

(58) Field of Classification Search
  CPC .... G06F 1/1632; G06F 1/1626; G06F 1/1637; H02G 3/14; F16M 13/02
  USPC .............. 361/679.32, 679.3, 679.56, 679.41; 206/701, 775, 776
  See application file for complete search history.

(56) References Cited

U.S. PATENT DOCUMENTS

| | | | |
|---|---|---|---|
| 9,307,131 B1* | 4/2016 | Breen | H04N 5/2257 |
| 2003/0221876 A1* | 12/2003 | Doczy | G06F 1/1626 178/18.01 |
| 2009/0009945 A1* | 1/2009 | Johnson | G06F 1/1613 361/679.27 |
| 2013/0342087 A1* | 12/2013 | Guran | F16M 13/02 312/7.2 |
| 2016/0003270 A1* | 1/2016 | Franklin | F16B 1/00 439/529 |

* cited by examiner

*Primary Examiner* — Anthony M Haughton
(74) *Attorney, Agent, or Firm* — Cygnet IP Law, P.A.; Stephen W. Aycock, II

(57) ABSTRACT

An apparatus permitting tablet computers to be mounted flush against a flat surface is disclosed. The apparatus houses the tablet securely by way of a precisely dimensioned, flush-mounted base that features a custom-fitted opening which permits the tablet to press-fitted and placed inside. Once the tablet is installed, a face plate cover is placed on top of the base piece for aesthetics. The face plate mates with the base piece via snap fasteners, magnets, or other means which permit the pieces to remain secure with respect to each other, yet remain easily removable. The base piece features clearance slots for the various input & output ports of the tablet computer, such as, but is not limited to, power, audio, and connectivity.

17 Claims, 7 Drawing Sheets

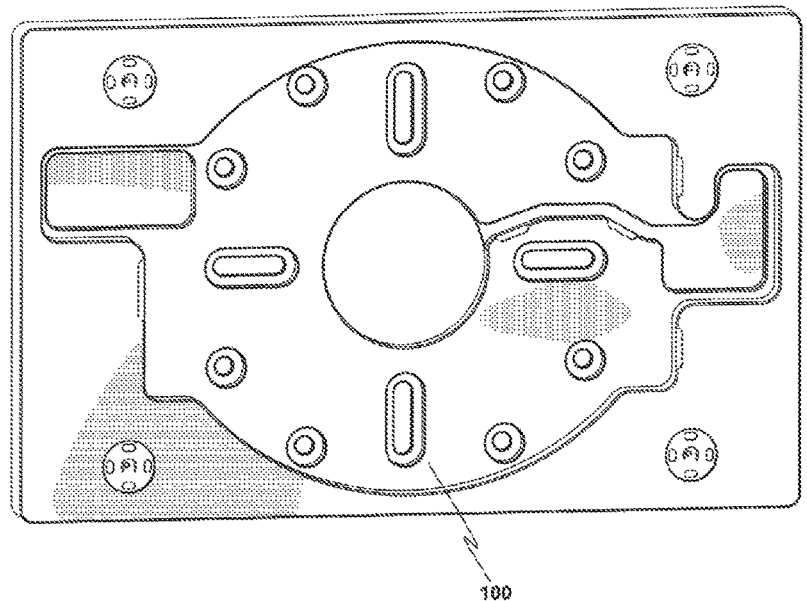
FIGURE 8
FIGURE 9
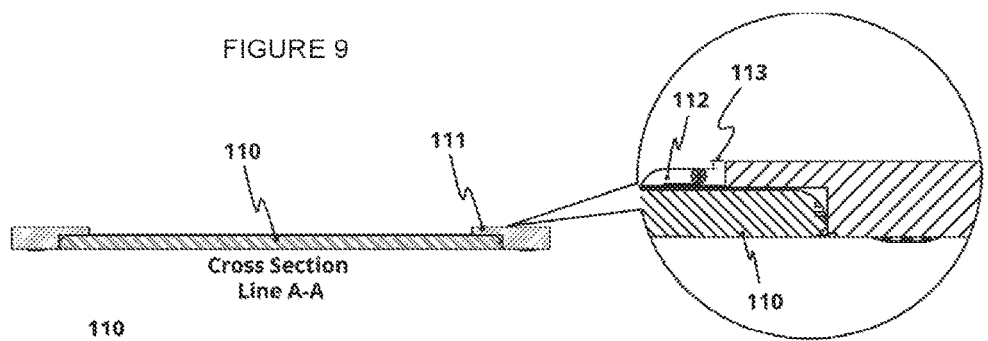
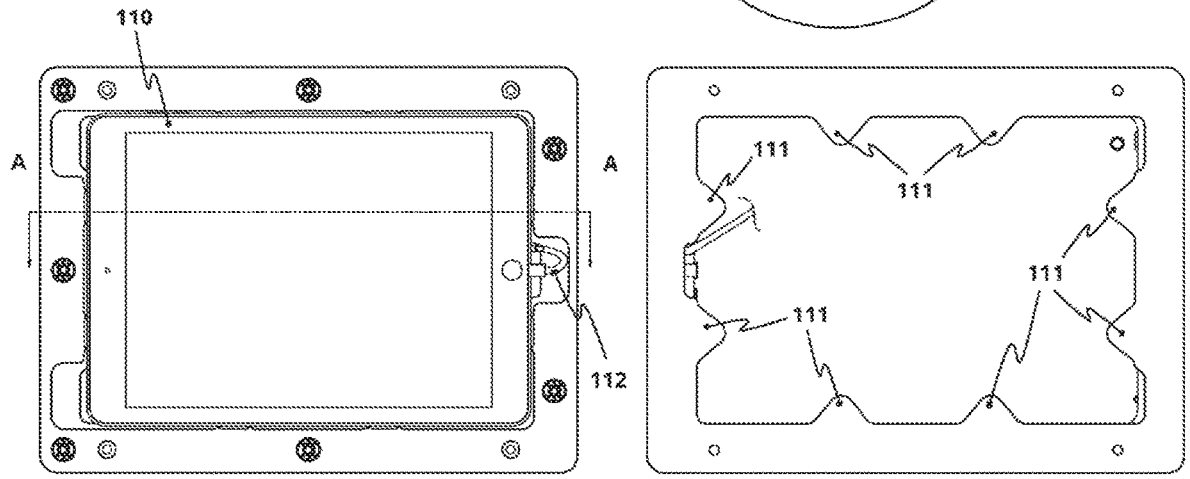

TABLET COMPUTER SURFACE MOUNT

RELATED APPLICATIONS

This application claims the benefit of U.S. Application No. 62/660,300, entitled "On-Wall Slim Tablet Computer Surface Mount with Tool-Less, Removable Tablet Access, Hidden Wiring, and Optimized Voice Control Support," and filed on Apr. 20, 2018, which is incorporated herein by reference in its entirety.

FIELD

This disclosed subject matter pertains to an apparatus, which permits a tablet computer to be mounted onto any flat surface, such as, but is not limited to, drywall, glass panes, desktops, or countertops. Some implementations of the disclosed subject matter securely contain a tablet computer to be displayed and any connected wiring to keep the tablet computer charged. Some implementations of the disclosed subject matter feature a solid front face plate for aesthetics, with no or a minimum number of holes while still allowing sound to pass to and from the tablet computer. It can be manufactured in varying sizes to custom fit the various tablet computers sold in the market.

BACKGROUND

Historically, traditional touch screen controls, interactive displays, and other touch-feedback digital signage use touch screen PCs, which consist of full-fledged computers packed tightly together with a display screen and touch sensor overlay into a single assembly. These were then mounted in varying locations ranging from private residences & homes to public spaces such as airports, shopping malls, and the like.

Generally, tablets are designed for portable use. As evidenced by their slim form factors and light weight, they are meant to be carried around, and with their built-in, rechargeable batteries, they do not need to be affixed into a single location for use and only require occasional recharging.

However, with the cost of tablet computers dropping dramatically within recent years, they have now become viable alternatives to expensive, bulky, dedicated touch screen controls. Many companies now have applications or "Apps" that run on tablets, which permit them to be used as dedicated controllers, touch panel kiosks, digital signage, and other usage scenarios. The problem now presents itself of securely mounting the tablet computer into a single location, e.g., usually a wall or other flat surface, while permitting it to be kept charged, and/or permitting easy removal on demand.

Products in the prior art can mount tablets onto flat surfaces by enclosing the tablet into a VESA mount-ready/VESA-compatible casing. This takes advantage of the existing VESA standard and permits users to choose from the plethora of already existing VESA-compatible mounting products, which treat the tablet as if it were a monitor or flat-screen TV.

However, due to the wide variety of tablets available in the marketplace and their varying sizes, manufacturers of products in the prior art usually create a small number of (usually 2-3) 'universal fit' cases, where each size would fit a range of tablet sizes. For example, a small case would fit tablets up to 8-inches, medium cases would fit tablets up to 10-inches, and large cases would fit tablets up to 13-inches. To permit the varying-sized tablets to fit correctly within each design, 'fit kits' consisting of foam or plastic bumpers are included to properly center the tablet. However, this usually leaves the product with very wide bezels, which are often unsightly, but they are required as each tablet size is quite different from one model to the next.

One problem these designs can create is a lack of easy tablet access. Many VESA-compatible cases are assembled with mechanical fasteners or a lock, and thus, it would need a tool to permit tablet access. In many instances quick, tool-less tablet access is desired.

An additional problem that using VESA-compatible mounting brackets create is having an often undesired gap space between the back of the casing or enclosure, to the flat surface where the device is mounted. This cannot be averted, since there is always some thickness to the VESA mounting bracket.

To resolve these problems, other products in the prior art provide an "in-wall mount" design, which eliminates this gap space by forcing the installer to cut a large, rectangular hole into the mounting surface to fit a recessed box, into which the enclosure assembly sits. While the end result is a "gapless" installation since the part is recessed into the wall, this installation technique permanently damages the wall. The wall requires repair should the mount be no longer usable, such as in the case where the mounted device dies and there is no replacement available. The installer is left with a large, gaping hole, where quite often, the only solution may be to install an even larger in-wall mount.

Furthermore, because there is a requirement of having an in-wall cutout, manufacturers cannot simply provide designs with "universal fit," as the bezels that permit multiple tablet sizes to fit would be far too wide for aesthetics purposes. Many customers would simply refuse to purchase the product since the large, wide bezels cannot blend in with their surroundings. Thus, one can easily observe and could conclude that this is the reason why there are very few and limited options for supported tablets and sizes for in-wall mounts on the market.

In addition, in-wall tablet mounts generally block and shield the mounted tablet computer's speakers and microphone, resulting in poor sound performance in audio-input based applications such as, but not limited to, intercom and voice controls. Some designs alleviate this issue by featuring holes in the front of the enclosure, but this can result in a lower-quality aesthetic and may not be acceptable by many clients.

Similar to the VESA-ready enclosures, in-wall mounts may secure the tablet by way of mechanical fasteners, sometimes behind an easily removable, non-secure faceplate. Again, the problem is presented where the user needs a tool to access or remove the wall mounted tablet.

To bypass these limitations, other products in the prior art may provide a "surface mount" option, so as to eliminate the gap space between the back of the enclosure and the flat mounting surface, permitting easy tablet access and removal, while also eliminating the need to cut large, rectangular holes to fit the mounting apparatus into the surface, and also fully exposing the tablet computer's speakers and microphone to the ambient environment. This can be done by using mobile "corner pieces" which can be moved and then mechanically (via screws) or chemically (via adhesives) fastened to a flat surface. However, this creates issues with exposed wiring, since the mounted tablet generally would need an always connected power supply and/or connectivity with the 3.5 mm headphone port. Due to the small size of the corner pieces, by design, there is no spacing available to permit the incorporation of electronics to route these wires. Like the VESA-ready enclosures, clients using these designs are now forced to either accept a lower-quality aesthetic if wires need to be connected, or the tablet would need to be constantly removed, recharged, and then placed back into its holder.

Therefore, prior art of simply using a VESA-ready enclosure, an in-wall enclosure, or an on-surface corner piece mounting kit will not always provide an optimal result. The finished setup will lack a high quality aesthetic in the case of gaps on VESA-ready enclosures and exposed wiring when using on-surface corner pieces. For in-wall tablet enclosure mounting kits, the installation itself can cause permanent, costly-to-repair wall damage, along with poor audio performance, plus high repair and installation costs when the tablet computer dies and the tablet mount must be replaced, since future tablet sizes will not likely match the previously installed tablet computer. For in-wall and VESA ready enclosures, the tablet is often not easily accessible or removable without the use of tooling. There is a need for an improved tablet computer mount design which permits easy tablet removal, can properly fit a variety of specific tablet sizes and designs, permit cabling to be hidden while connected, mounts flush onto any surface without massive wall damage, permits the microphone and speakers to be fully functional, all while showing a highly aesthetic face plate.

SUMMARY

Some implementations relate to an apparatus, which permits a tablet computer to be mounted onto any flat surface, such as, but is not limited to, drywall, glass panes, desktops, or countertops. Some implementations can securely contain a tablet computer to be displayed and any connected wiring to keep the tablet computer charged. Some implementations feature a solid front face plate for aesthetics, with no or a minimum number of holes. It can be manufactured in varying sizes to custom fit the various tablet computers sold in the market.

In practice, tablet computers permit users to perform a wide variety of tasks by way of their interactive touch screens. Electronic designs can take advantage of this fact, as evidenced by the plethora of applications or "Apps." These Apps permit users to use the device as an interactive display, digital signage, audio-visual controls, home automation controller, voice controls, and other various applications. However, tablet are generally not designed to be easily mountable onto any surface, and lack an always connected power supply that permits it to continually operate. Specialized tablets that are designed for wall mounting usually require a VESA bracket, which semi-permanently mounts the device into a fixed location. An implementation of the disclosed subject matter can permit the use of a tablet computer to be easily accessible in a fixed, mounted location, yet permits easy tablet removal, while it runs various apps at any time.

In a first aspect of the disclosed subject matter, an apparatus, which permits a tablet computer to be mounted onto the wall, is disclosed. The apparatus consists of two parts: a base piece and a face plate.

In a second aspect of the disclosed subject matter, the base piece features a precision manufactured cutout in the center, which matches the size of a specific model of tablet computer. This permits a tablet computer to be press-fit into the precision cutout and be seated securely.

In a third aspect of the disclosed subject matter, the base piece features mechanically pressed button receptacles, which will mate with the corresponding buttons, studs, or posts on the face plate. These buttons sit on the periphery of the base piece, surrounding the centered cutout.

In one variant, the base piece features washers or other metal parts which are mechanically pressed or chemically adhered into the base piece, instead of mechanically pressed button receptacles. These washers will mate with a corresponding magnet on the face plate. These washers sit on the periphery of the base piece, surrounding the centered cutout.

In another variant, the base piece can feature magnets, washers, or other ferrous parts; which are mechanically pressed or chemically adhered into the base piece, instead of mechanically pressed button receptacles or washers. These magnets will mate with a corresponding magnet, washer, or other ferrous part on the face plate. These magnets sit on the periphery of the base piece, surrounding the centered cutout.

In a fourth aspect of the disclosed subject matter, the width of the base piece may be expanded and widened on one edge, which permits void space to be available for the incorporation of additional electronics. These integrated electronics can serve key functions when tablets are mounted, such as, but not limited to, charging via a USB cable, LED indicators, and other features.

In a fifth aspect of the disclosed subject matter, the base piece features slots or clearance cutouts next to the input/output ports of the tablet computer, such as, but not limited to, the USB/Lightning charging port, video output, HDMI, or Mini-Display port, or 3.5 mm headphone port. This permits the tablet computer to be connected with a power charging cable, have the audio and/or video outputs be diverted elsewhere, or connect a peripheral that uses the 3.5 mm headphone port for connectivity.

In a sixth aspect of the disclosed subject matter, the base piece features a slot or clearance cutout next to the physical control buttons of the tablet computer, such as but not limited to, the power and volume buttons. This ensures that when the tablet is press-fitted and installed into the base piece, the buttons are not actuated or being pressed by the base piece itself, which can result in unintended changes in, such as, but not limited to, the power status of the tablet, screen visibility, or volume level of the tablet.

In one variant, the slot or clearance cutout for the physical control buttons can be enlarged far beyond what is necessary to prevent accidental button actuation. This can permit a user to use a finger or other tool to actuate the buttons of the mounted tablet computer.

In a seventh aspect of the disclosed subject matter, the base piece features a flat backside, which permits it to be mounted flush onto any flat surface, by way of mechanical fasteners.

In one variant, the base piece backside can include recessed cutouts, which permit adhesives, epoxies, or other chemicals to be applied in the void space. This permits the base piece to be mounted onto any flat surface without the use of mechanical fasteners and other non-mechanical means.

In another variant, the base piece can also be designed for direct mounting onto a standard electrical junction box, or colloquially known as a gang box. The design can be made to mount onto standard US, EU, and/or UK single, double, or triple gang boxes, depending on the size of the base piece.

In an eighth aspect of the disclosed subject matter, the base piece is designed with minimal thickness in mind. The thickness of the base piece is determined by adding the following dimensions; first, the thickness of the tablet, which allows the apparatus to fit the device itself; second, the thickness of a power cable which runs into the clearance slot and behind the tablet to an independent power source;

and lastly, a minor additional thickness or clearance to permit ease of installation and/or for the structural integrity of the base piece.

In a ninth aspect of the disclosed subject matter, the base piece can include additional physical features, which route the sound output of the tablet away from the microphone on the same tablet. This ensures that if the tablet is used for intercom, voice controls, or other audio-input related applications, interference from the audio speakers' outputs are minimized.

In a tenth aspect of the disclosed subject matter, the face plate features a precision manufactured cutout in the center, which matches the size of a specific model of tablet computer. This permits a tablet computer be used with full access to the entire front screen, as well as any physical buttons in the front.

In one variant, the center cutout of the face piece can be dimensioned to only show the touch display, blocking any physical buttons or other front features of the tablet from view.

In an eleventh aspect of the disclosed subject matter, the face plate features matching parts, such as but not limited to, button receptacles, magnets, or ferrous parts; as disclosed in the third aspect of the disclosed subject matter. This can permit the face plate to be assembled with the base piece securely, yet still permit simple face plate removal by hand, without any tools.

In a twelfth aspect of the disclosed subject matter, the inside edge of the precision manufactured cutout in the center, as disclosed in the tenth aspect, would have a precision sized undercut built-in. This permits an open air path for sound to travel from the ambient environment into the tablet's microphone, and eliminates the need for holes on the front face plate to permit full microphone functionality.

In a thirteenth aspect of the disclosed subject matter, the face plate can feature security screw mounting points, where if an installer desires a permanent, secure installation, the face plate can have optional screws installed, turning the easily removable faceplate into a secure part that prevents unauthorized and unintended tablet removal.

BRIEF DESCRIPTION OF THE DRAWINGS

FIG. 8 is a diagram of a base plate for a smaller tablet computer mount in accordance with some implementations.

FIG. 9 is a side cutaway profile view of an example base piece in accordance with some implementations.

DETAILED DESCRIPTION

Those of ordinary skill in the art will realize that the following detailed description of the disclosed subject matter is illustrative only and is not intended to be in any way limiting. Other embodiments of the disclosed subject matter will readily suggest themselves to such skilled persons having the benefit of this disclosure. Reference will now be made in detail to implementations of the disclosed subject matter as illustrated in the accompanying drawings. The same reference indicators will be used throughout the drawings and the following detailed description to refer to the same or like parts.

Figure 1:
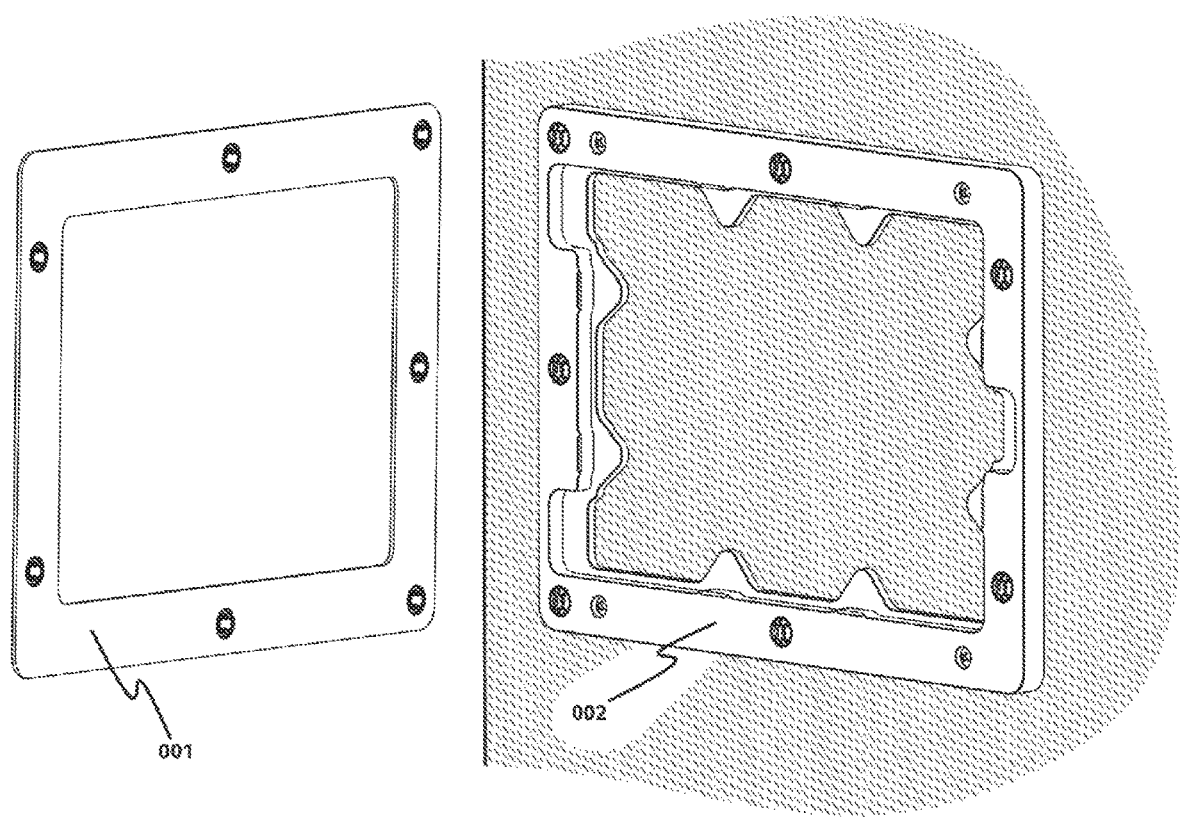
FIG. 1 is a diagram of an example on-wall slim tablet computer surface mount in accordance with some implementations.

FIG. 1 demonstrates the disclosed subject matter's core components, with the face plate (001) and base piece (002), in an exploded, folding view.

Figure 2:
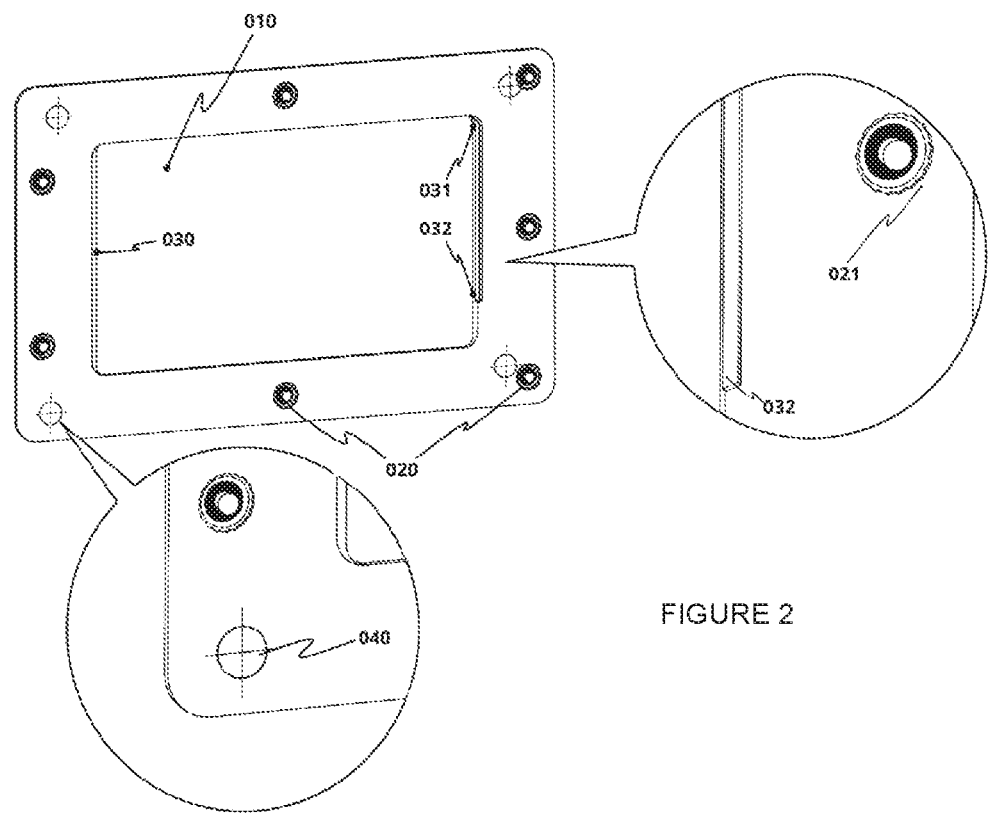
FIG. 2 is a diagram of an example face plate in accordance with some implementations.

FIG. 2 shows the face plate with a precision cutout in the center (010). This cutout matches the size of the tablet computer to be mounted and permits the touch screen and front controls to be exposed.

Figure 3:
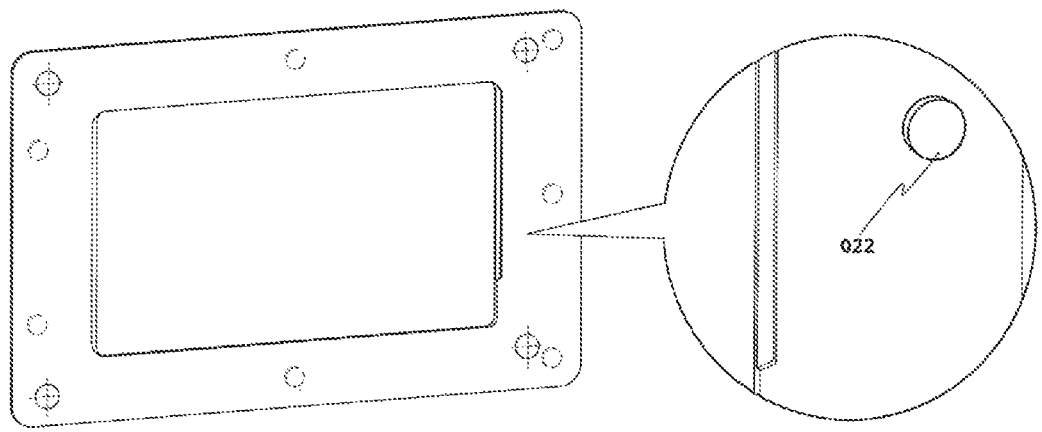
FIG. 3 is a diagram of an example face plate in accordance with some implementations.

The face plate is illustrated with a series of mechanically pressed button studs (020), which are installed by mechanical pressing and deforming the material around the outer periphery or circumference of the button stud (021), which forces the stud to be retained within the designed space. Alternatively, chemical bonding agents or adhesives can be used in place of or in addition to mechanical pressing. As shown in FIG. 3, magnets (022) may also be used in place of buttons/studs. Either method will permit quick installation or removal of the face plate against the base piece.

The same face plate can also feature an undercut on the inside edge (030) that mates with the base piece. This permits the sound to travel from the ambient environment into the tablet computer's microphones, without the need for holes in the front face plate. This undercut can cover the entire length of one edge of the face plate (030), or it can be designed to cover only a partial length of one edge (031), terminating before it reaches the opposing edge (032), depending on how the sound needs to be routed with the tablet computer to be installed.

The same face plate can also feature optional security screw mounting points (040) on the inside face of the face plate, which permit an optimized location to add a screw, should a secured installation that requires tooling for tablet removal to be desired.

Figure 4:
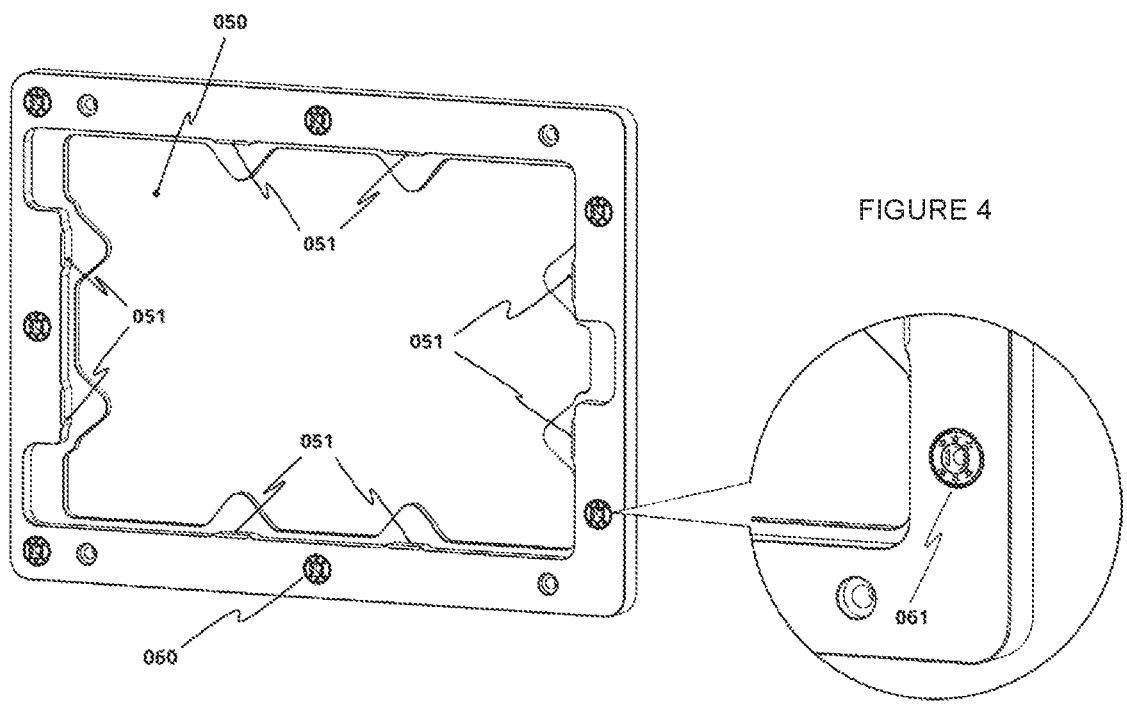
FIG. 4 is a diagram of an example base plate in accordance with some implementations.

FIG. 4 demonstrates a base plate of the tablet computer mount. The base piece has a precision manufactured cutout in the center (050), which permits a specific tablet model to be press fitted into this location. The tablet is held securely in place by precisely sized spacers built into the base piece (051), which closely match the length and width of the tablet computer to be installed.

Figure 5:
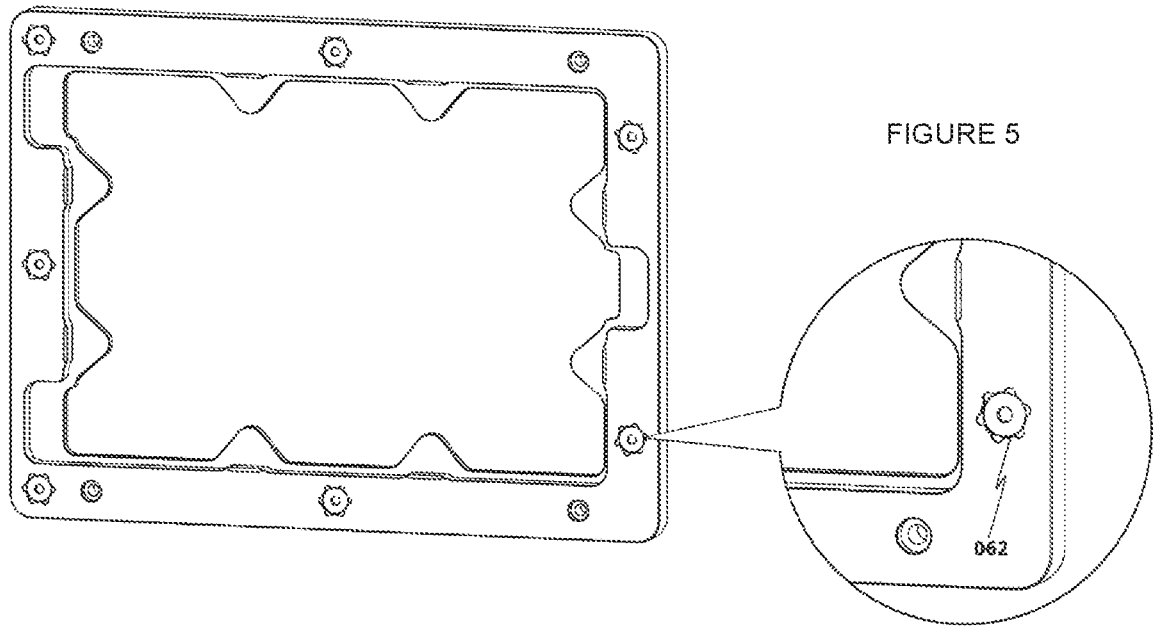
FIG. 5 is a diagram of an example base plate in accordance with some implementations.

The base piece includes matching mechanically pressed button receptacles (060), which corresponds to the face plate's studs (020). These receptacles are mechanically pressed by deforming the material around the outer periphery or circumference of the button receptacle (061), which forces the receptacle to be retained within the designed space. Similarly, as shown in FIG. 5, washers (062) may be installed if a magnet is used instead.

Figure 6:
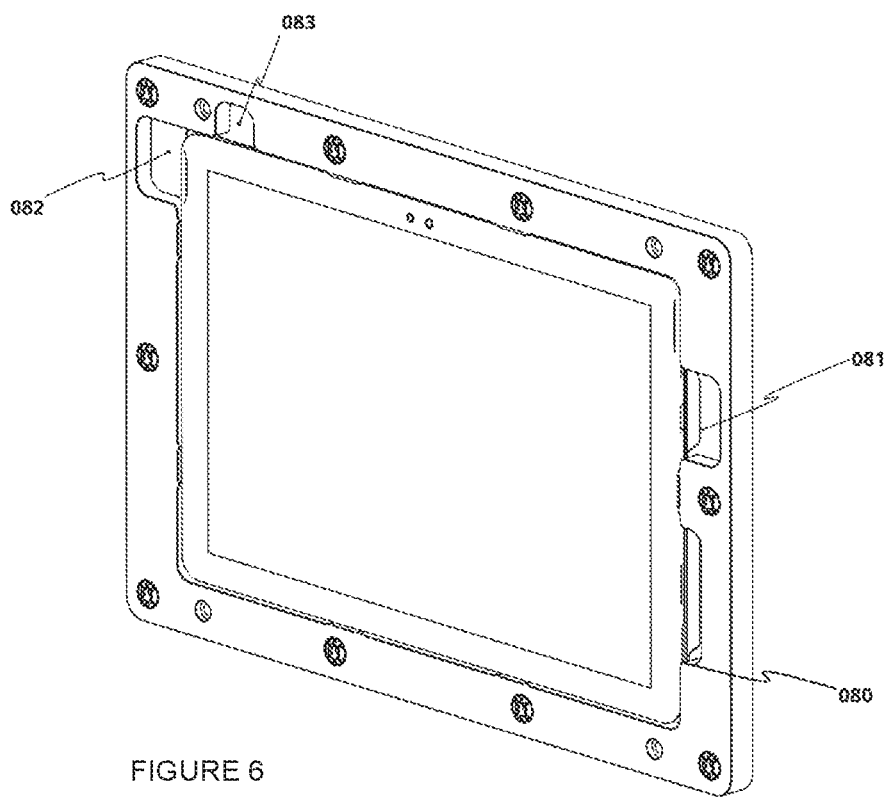
FIG. 6 is a diagram of an example base piece with a tablet computer installed in accordance with some implementations.

FIG. 6 shows the base piece with a tablet computer installed, and highlights the base piece's clearance slots for the tablet computer's input and output ports, such as, but not limited to, USB charging connector (080), auxiliary audio & video output ports for HDMI, mini Displayport, or 3.5 mm headphone jacks (081), and shows enlarged slots for the power button (082). The area next to the volume button also features a small clearance to prevent unintended actuation (083).

Figure 7:
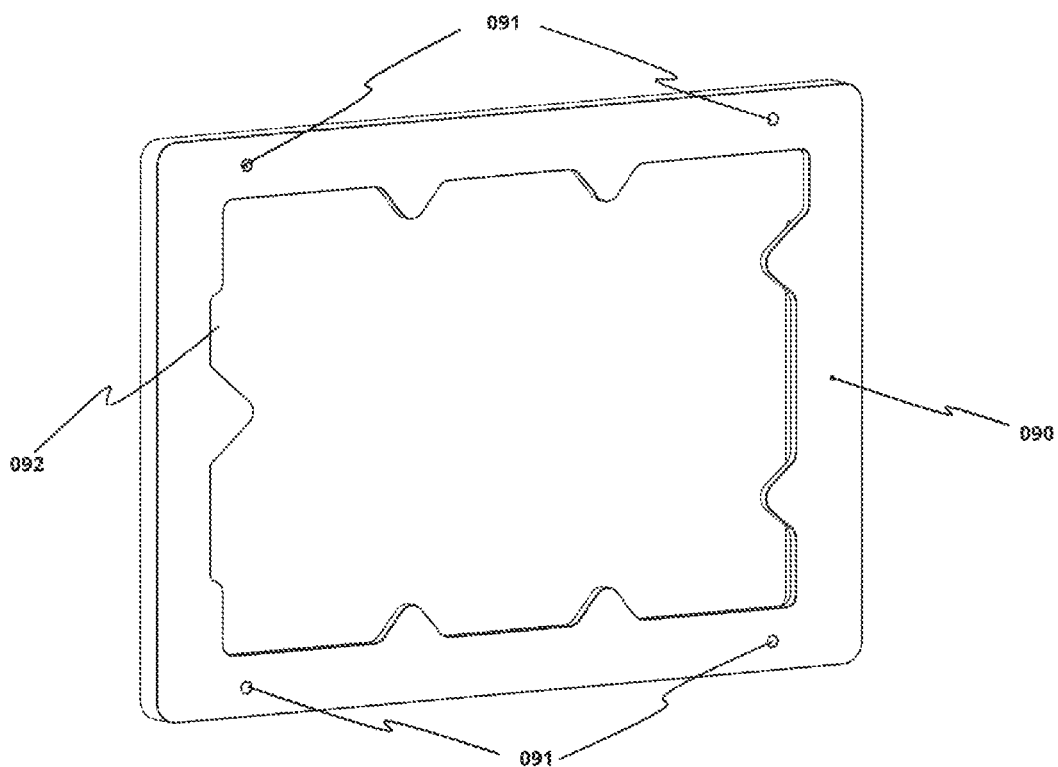
FIG. 7 is a diagram of an example flat back side of the base piece in accordance with some implementations.

FIG. 7 illustrates the flat back side of the base piece (090), which permits it to be installed onto any flat surface. Pre-drilled screw holes (091) can be used to mechanically fasten the base piece to the intended installation surface. Additional clearance (092) can also be added to permit connected wires to pass behind the mounted tablet.

FIG. 8 demonstrates a base plate for a smaller tablet computer mount. If desired, the base plate can be designed for mounting directly into a standard electrical junction box instead of a flat surface, complete with pre-drilled guide holes (100) for US, EU, and UK single, double, or larger gang boxes.

FIG. 9 shows the side cutaway profile view of the base piece, along with an installed tablet computer (110). The total thickness is minimized to simply incorporate spacing for the thickness of the tablet itself (110), plus a support feature (111) which has a thickness equal to thickness of the tablet's charging cable (112) which may be needed to connect to a power source, plus an additional thickness (113) for ease of installation and/or structural integrity of the base piece itself.

Figure 10:
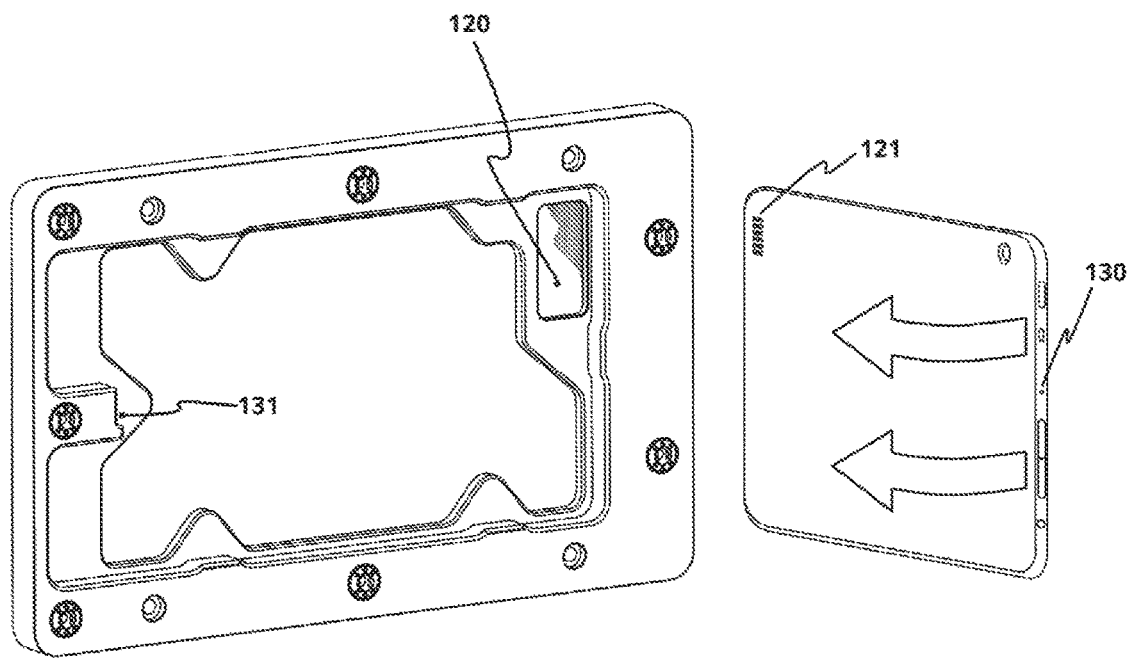
FIG. 10 is a front isometric view of an example base piece in accordance with some implementations.

FIG. 10 shows a front isometric view of the base piece, highlighting the physical features (120) which isolate the output of the tablet computer's speakers (121) away from the microphone (130) on the same device. An additional clearance (131) is added for the microphone to work in concert with the undercut on the inside edge (030) of the face plate(001) that mates with the base piece (002), which permits the sound to travel from the ambient environment into the tablet computer's microphones, without the need for holes in the front face plate. This design minimizes the speaker's sound from re-entering the microphone as background noise.

Figure 11:
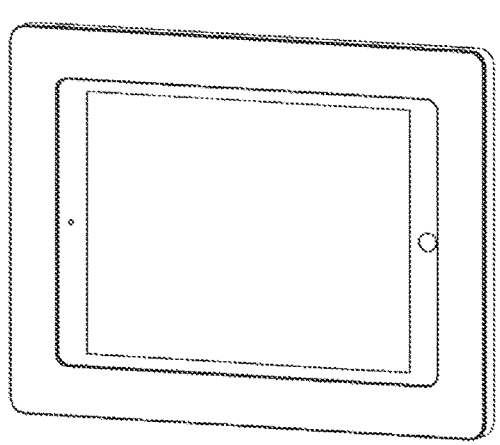
FIGS. 11, 12, and 13 show an example on-wall slim tablet computer surface mount in accordance with some implementations.
Figure 12:
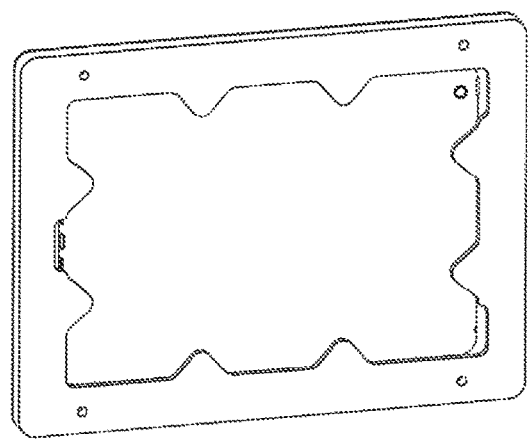
Figure 13:
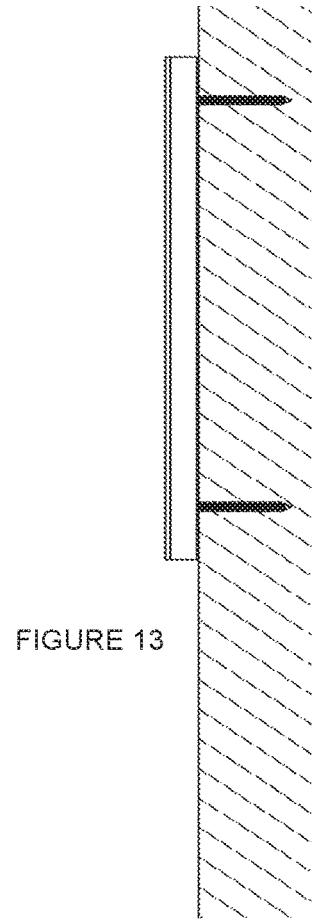

FIGS. 11, 12, and 13 demonstrate one of the many possible and various form factors that the disclosed mount can be in. In this variant, an implementation of the disclosed subject matter can be sized to fit a variety of specific tablet sizes and designs which permit a tablet computer to be flush mounted onto any flat surface; in any orientation, such as but not limited to, landscape or portrait; yet be easily removable. The base piece is mounted onto the surface without the need to cut large holes, and permits charging, audio, or other cabling to be routed behind the tablet while connected. Once the face plate is installed, all wiring is hidden for a clean look, while the front touch screen and buttons remain fully accessible. Simultaneously, the microphone and speakers remain fully functional with its integrated sound routing features. The face plate can be removed to access the tablet computer's power or volume controls at any time, or to remove the tablet. The user simply needs to pull on the part, which is fastened to the base piece via methods such as, but not limited to, mechanical stud and socket buttons, or via magnet and washer combinations.

Figures 14, 15, 16:
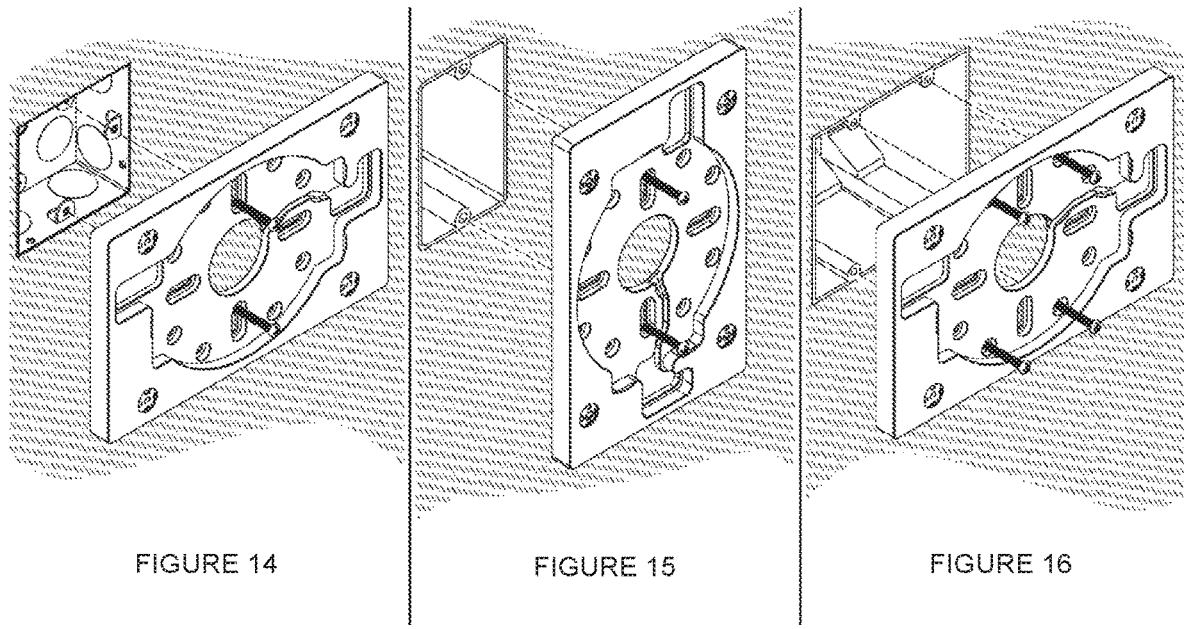
FIGS. 14, 15, and 16 show an example on-wall slim tablet computer surface mount in accordance with some implementations.

FIGS. 14, 15, and 16 demonstrate another possible form factor that an implementation of the disclosed subject matter can be in. In this variant, the base plate is sized to fit a small tablet computer, which can be flush mounted directly into a standard EU gang box (FIG. 14), standard US single gang box (FIG. 15), and standard US double gang box (FIG. 16).

It is contemplated that any optional feature of the inventive variations described may be set forth and claimed independently, or in combination with any one or more of the features described herein. Reference to a singular item, includes the possibility that there is a plurality of the same items present. More specifically, as used herein and in the appended claims, the singular forms "a," "an," "said," and "the" include plural referents unless specifically stated otherwise. In other words, use of the articles allow for "at least one" of the subject item in the description above as well as the claims below. As such, this statement is intended to serve as antecedent basis for use of such exclusive terminology as "solely," "only" and the like in connection with the recitation of claim elements, or use of a "negative" limitation.

Without the use of such exclusive terminology, the term "comprising" in the claims shall allow for the inclusion of any additional element irrespective of whether a given number of elements are enumerated in the claim, or the addition of a feature could be regarded as transforming the nature of an element set forth in the claims. Except as specifically defined herein, all technical and scientific terms used herein are to be given as broad a commonly understood meaning as possible while maintaining claim validity.

The term "tablet computer" refers to a portable personal computer complete with a mobile operating system, touchscreen display, and rechargeable battery built together in a single unit with a thin, flat form factor. Popular tablet computers include, but are not limited to, Apple iPads, Apple iPods, Samsung Galaxy tablets, Amazon Fire tablets, and Windows Surface tablets.

The term "flush" or "flush mount" refers to attaching two parts or components together with little to no gap between the two.

The term "buttons" refers to fasteners that can be mated and connected together securely by applying force to adjoin the two parts, but can be easily unmated or disconnected. This can consist of a "socket and stud" or "stud and post" mechanical buttons, or it can also be a set of matching magnets.

The term "VESA" refers to the VESA Mounting Interface Standard or VESA mount, which is a family of standards defined by the Video Electronics Standards Association for mounting flat panel monitors, TVs, and other displays to stands or wall mounts. It is implemented on most modern flat-panel monitors, TVs, and some specialized tablets designed for mounting.

The breadth of the disclosed subject matter is not to be limited to the examples provided and/or the subject specification, but rather only by the scope of the claim language. Further, it is not intended that any section of this specification (e.g., the Summary, Detailed Description, Abstract, Field, etc.) be accorded special significance. All references cited are incorporated by reference in their entirety. Although the foregoing disclosed subject matter has been described in detail for purposes of clarity of understanding, it is contemplated that certain modifications may be practiced.

What is claimed is:

1. A tablet computer mounting system comprising: a base piece having a cutout in a central area of the base piece, the cutout constructed to fit a tablet computer, wherein the base piece includes one or more base piece attachment members; and a face plate having one or more face plate attachment members that are constructed to couple with the one or more base piece attachment members, wherein the face plate includes a face plate cutout disposed in a central area of the face plate and configured to match a size of a specific model of tablet computer so as to permit the tablet computer to be used with full access to an entire front screen and physical buttons on a front of the tablet computer, wherein the face plate cut out of the face plate is dimensioned to only show a touch display, blocking any physical buttons or other front features of the tablet from view, and wherein the face plate cutout includes an undercut formed on an inside edge of the face plate cutout to provide an open air path for sound to travel from an ambient surrounding environment into a microphone of the tablet computer.

2. The system of claim 1, wherein the one or more base piece attachment members are disposed on a periphery of the base piece surrounding the cutout.

3. The system of claim 1, wherein the base piece attachment members include one or more receptacles, and wherein the face plate attachment members include one or more button studs corresponding to the one or more receptacles, wherein the one or more receptacles are configured to releasably secure the corresponding one or more button studs.

4. The system of claim 1, wherein the base piece attachment members include one or more magnets, and wherein the face plate attachment members include one or more ferrous metal members corresponding to the one or more magnets, wherein the one or more magnets are configured to releasably secure the corresponding one or more ferrous metal members.

5. The system of claim 3, wherein the base piece attachment members are attached to the base piece using one of mechanical forming or chemical adhesive.

6. The system of claim 1, wherein the face plate attachment members are attached to the face plate using one of mechanical pressing to deform material around the face plate attachment members and lock the face plate attachment members in place on the face plate, or chemical adhesives.

7. The system of claim 1, wherein a width of the base piece includes an expanded and widened edge to permit void space to be available for incorporation of additional electronics including one or more of a charging port, or one or more indicator lights.

8. The system of claim 1, wherein the base piece includes one or more slots or one or more clearance cutouts disposed adjacent to input/output ports of a tablet computer when installed in the system.

9. The system of claim 8, wherein the input/output ports include one or more of: a USB/Lightning charging port, an audio/video output port, an HDMI port, a Mini-Display port, or a 3.5 mm headphone port.

10. The system of claim 1, wherein the base piece includes a slot or clearance cutout disposed adjacent to one or more physical control buttons of the tablet computer.

11. The system of claim 10, wherein the one or more physical control buttons of the tablet computer includes a power button or one or more volume buttons.

12. The system of claim 10, wherein the slot or clearance cutout for the physical control buttons is enlarged to prevent accidental button actuation.

13. The system of claim 1, wherein the base piece includes a flat backside to permit the base piece to be mounted flush onto a flat surface by way of mechanical fasteners, and wherein total thickness of the system is minimized by incorporating spacing for a thickness of the tablet and a support feature having a thickness equal to a thickness of the charging cable of the tablet and an additional thickness for ease of installation and/or structural integrity of the base piece.

14. The system of claim 13, wherein the flat backside includes one or more recessed cutouts to permit adhesives, epoxies, or other chemicals to be applied in a void space to permit the base piece to be mounted onto a flat surface without use of mechanical fasteners.

15. The system of claim 13, wherein the base piece is constructed to be directly mounted onto a standard electrical junction box including one of a standard US, EU, and/or UK single, double, or triple junction box.

16. The system of claim 1, wherein the face plate includes one or more security screw mounting points on an inside face of the face plate to provide a location to insert a screw and to provide a secured installation that requires tooling for tablet removal.

17. The system of claim 1, wherein the base piece includes additional physical features to route sound output of the tablet computer away from a microphone on the tablet computer.

* * * * *